(12) United States Patent
Mitchell

(10) Patent No.: US 6,840,327 B2
(45) Date of Patent: Jan. 11, 2005

(54) ANNULAR PRESSURE SPOOL

(75) Inventor: Bruce Mitchell, Calgary (CA)

(73) Assignee: Bruce Stephen Mitchell, Calgary (CA)

( * ) Notice: Subject to any disclaimer, the term of this patent is extended or adjusted under 35 U.S.C. 154(b) by 83 days.

(21) Appl. No.: 10/265,356

(22) Filed: Oct. 7, 2002

(65) Prior Publication Data

US 2003/0066687 A1 Apr. 10, 2003

(30) Foreign Application Priority Data

Oct. 5, 2001 (CA) .............................................. 2358242

(51) Int. Cl.⁷ .............................................. E21B 33/02
(52) U.S. Cl. ...................... 166/387; 166/84.4; 166/88.4
(58) Field of Search ............................... 166/84.4, 86.1, 166/86.2, 88.1, 88.4, 81.1, 387

(56) References Cited

U.S. PATENT DOCUMENTS

| | | | | |
|---|---|---|---|---|
| 1,586,923 A | * | 6/1926 | Townsend ................... 166/77.4 |
| 2,458,270 A | * | 1/1949 | Humason ...................... 417/90 |
| 2,945,665 A | * | 7/1960 | Regan et al. ................ 277/332 |
| 3,614,111 A | * | 10/1971 | Regan .......................... 251/1.2 |
| 3,897,040 A | * | 7/1975 | Le Rouax ..................... 251/1.2 |
| 5,588,491 A | * | 12/1996 | Brugman et al. ........... 166/383 |
| 6,024,172 A | * | 2/2000 | Lee .............................. 166/363 |
| 6,167,959 B1 | * | 1/2001 | Bassinger et al. .......... 166/84.2 |
| 6,615,921 B2 | * | 9/2003 | Whitelaw et al. ........... 166/349 |
| 6,702,012 B2 | * | 3/2004 | Bailey et al. ............... 166/84.4 |

* cited by examiner

Primary Examiner—David Bagnell
Assistant Examiner—Daniel P Stephenson

(57) ABSTRACT

A well bore pressure containment device is provided. Operating as a single stripping and containment device compatible with a wide range of tool string and tubing sizes, the containment device may be integrated with rotating pressure control systems, and be used during completion and work over operations. The containment device has a spool, and a flexible bladder extending about the interior of the spool. The bladder may be controllably deformed to seal against a tool string passing through the device using an inwardly directed pressure, which preferably is exerted by a fluid in the interstitial space between the spool and the bladder.

25 Claims, 4 Drawing Sheets

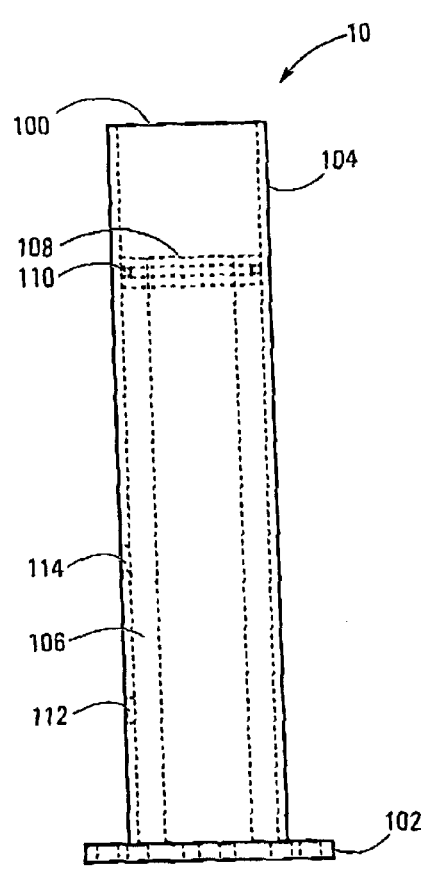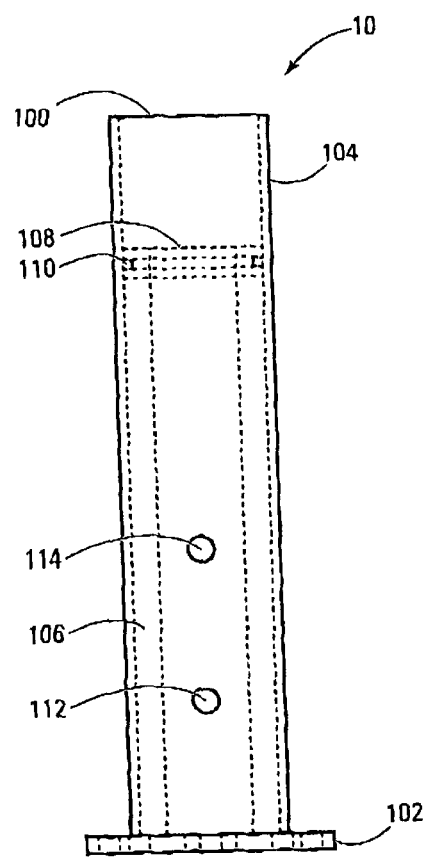
FIG. 1A  FIG. 1B
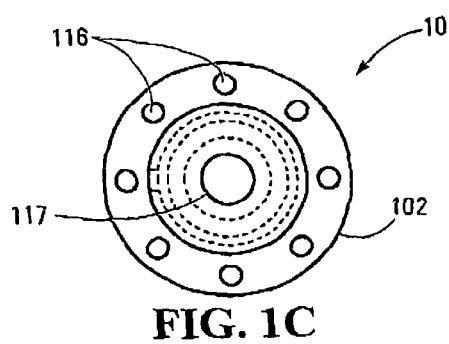
FIG. 1C

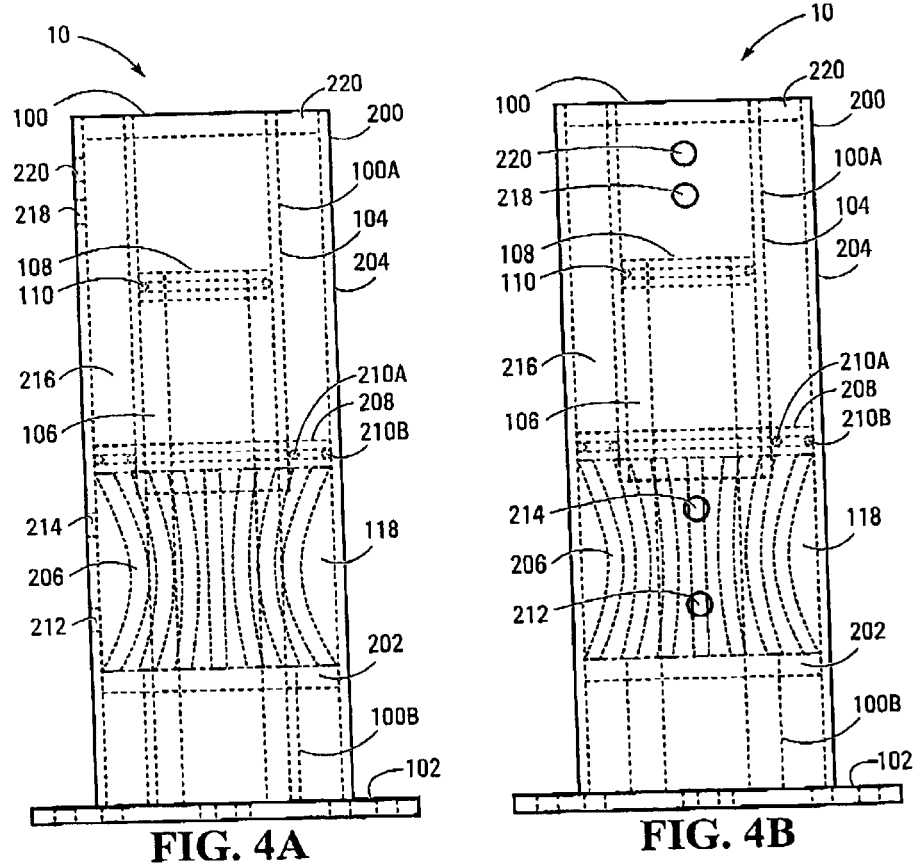
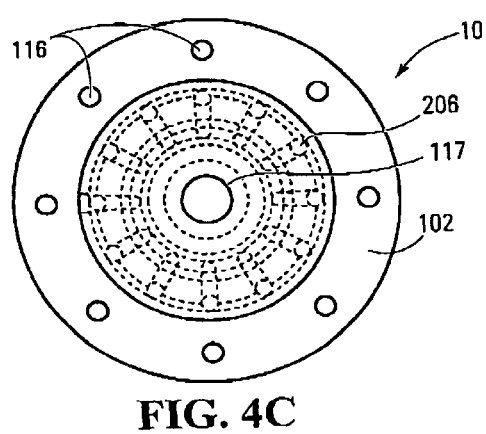
FIG. 4A  FIG. 4B
FIG. 4C

ANNULAR PRESSURE SPOOL

FIELD OF THE INVENTION

This invention relates to oil and gas well drilling as well as to completion and production of the same, and more particularly to pressure containment for using cools in under balanced drilling and snubbing operations.

BACKGROUND OF THE INVENTION

In the drilling, completion, and production of oil and gas wells, it is common practice to work with formation pressure. There are various stages and conditions of an oil or gas well during which access to the inside of the well is required. In underbalanced drilling, drilling occurs without restricting pressure from the well bore. Completion is a stage during which the well is perforated by shooting holes in the casing, while well servicing occurs during workover operations. In all of these cases, when drilling, completion or workover operations are performed, it is necessary in order to prevent hydrocarbons from leaking to atmosphere, to provide a containment device to contain gas within the well bore. This containment is important at all times but more particularly during snubbing operations when tool strings or tubing is jacked into and out of the well while the well is live. During snubbing, a stripping device is required for containment of the hydrocarbons, and the well bore pressure. Some standard containment approaches include a Blow Out Preventer (BOP) or an annular preventer, which comprise a piston which squeezes rubber to seal mechanically and may sit above a BOP. These systems may also be rotating pressure control systems. The standard approaches have limits with respect to the size or diameter of tool string or tubing that can be stripped in and out of the containment device for access to the well bore. Often if tool strings or tubing are of widely differing diameters, multiple annular containment spools are required, increasing costs incurred by the purchase and maintenance of multiple devices, and delays and lost production time due to the need to fit a new spool or containment device which fits the new tool string or tubing. This is particularly the case when switching between different tool strings and tubing used in drilling and work over operations. Due to the limits of the ranges of tool string and tubing shaft sizes compatible with standard devices, safety also becomes an issue when the size of a tool string or tubing is not within the safe range of shaft sizes compatible with the containment device. Size of the containment device itself is also an issue as it is more desirable to have a closely configured hydraulic jacking system.

It would be desirable in drilling and snubbing operations for there to a be a single stripping and containment device which has a wide range of tool string or tubing size compatibility. This is desirable for safety reasons and for cost efficiency. It is also desirable to find a single device which can be used for well bore pressure containment during underbalanced drilling, completion and work over operations. It is also more desirable to implement a smaller device than standard existing ones.

SUMMARY OF THE INVENTION

The present invention provides a single stripping and containment device which has a wide range of tool string and tubing shaft size compatibility, can be used for well bore pressure containment during underbalanced drilling, completion and work over operations, and can be integrated into rotating pressure control systems, and moreover is in general smaller in size than existing pressure control systems.

According to a first broad aspect the invention provides an apparatus for use in containing well bore pressure, comprising: a spool having a wall defining a passage therethrough for receiving a shaft; a seal disposed within said passage and having a flexible wall having first and second opposed surfaces, the first surface defining an aperture for receiving the shaft, the flexible wall being capable of flexing away from the spool wall to sealably engage the shaft in response to a force applied thereto, the second surface of the seal wall being accessible for receiving a controllable force directed away from the spool wall and towards said aperture for urging the seal wall inwardly of said passage.

According to a second broad aspect the invention provides an apparatus further comprising: a rigid annular piston sealably receivable within said spool; an outer spool having an outer spool will extending outside and about the spool; a plurality of cylindrical guiding fingers; an outer rigid annular piston sealably receivable inside of the outer spool and extending sealably about the spool and capable of translating in a direction along the axis of the spool; wherein an outer surface of the wall of the bladder, an inner surface of the outer spool wall, and a first end surface of the rigid annular piston define a chamber adapted for a fluid for use in exerting the controllable force, wherein the bladder is sealably fixed at one end to an inner surface of the spool, and is sealably secured to the first end surface of the rigid annular piston at the other end of the bladder, wherein the rigid annular piston is capable of translating in a direction along an axis of the spool in response to variations in a pressure of a fluid in the chamber, wherein the spool comprises an upper portion a lower portion with a gap therebetween, wherein an axis of each cylindrical guiding finger lien in a plane passing through an axis of the spool, and wherein the plurality of cylindrical guiding fingers are fixed at respective first ends to the inner surface of the outer spool wall, and are secured to the outer annular piston at respective second ends, and wherein the plurality of cylindrical guiding finger are adapted to be controllably deformed to forceably engage the outer surface of the wall of the bladder at portions thereof located at the gap in the spool using pressure exerted on the outer annular piston in a direction toward the first ends of the plurality of cylindrical fingers, thereby providing centering forces to the outer surface of the wail of the bladder.

According to a third broad aspect the invention provides a method of operating a seal for sealing to a shaft in a well bore, comprising the steps of providing: a seal having a flexible wall, said seal wall having first and second opposed surfaces, the first surface defining an aperture for receiving said shaft, and applying a force to said second surface to urge said seal wall against said shaft.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The invention will now be described in greater detail with reference to the accompanying diagrams, in which:

FIG. 1A is a side view of a well bore pressure containment device according to the invention;

FIG. 1B is a side view of a well bore pressure containment device according to the invention rotated 90 degrees around the vertical axis relative to the view shown in FIG. 1A;

FIG. 1C is a top view of a well bore pressure containment device according to the invention;

FIG. 4A is a side view of an alternate well bore pressure containment device incorporating bladder guiding polyurethane fingers;

FIG. 4B is a side view of the alternate well bore pressure containment device according to the invention rotated 90 degrees around the vertical axis relative to the view shown in FIG. 4A; and FIG. 4C is a top view of the alternate well bore pressure containment device according to the invention.

DETAILED DESCRIPTION OF THE PREFERRED EMBODIMENTS

Figure 2:
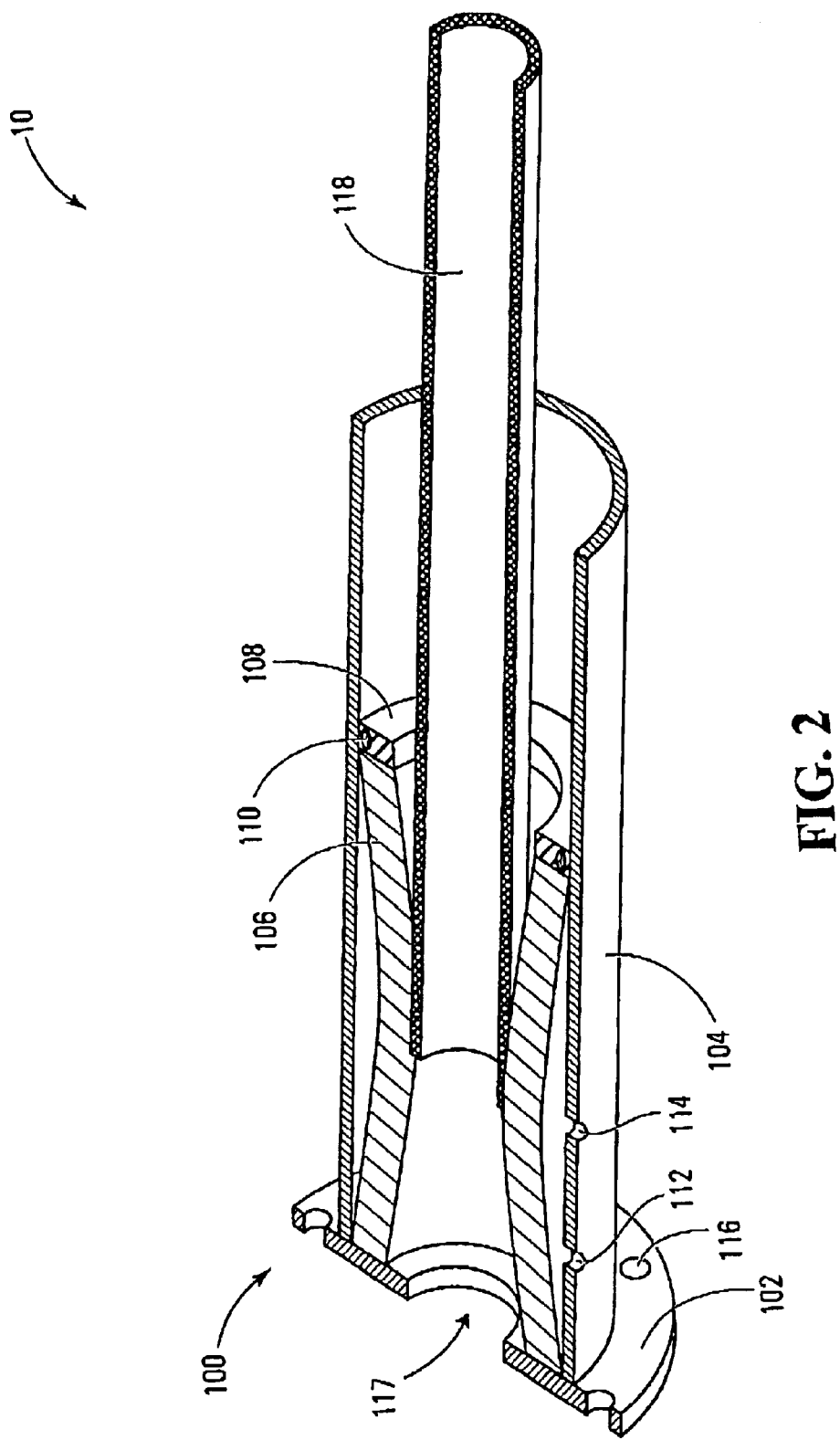
FIG. 2 is an isometric view of the well bore pressure containment device of FIGS. 1A, 1B, and 1C in use, with the containment device shown sectioned along its length to expose its interior.
Figure 3:
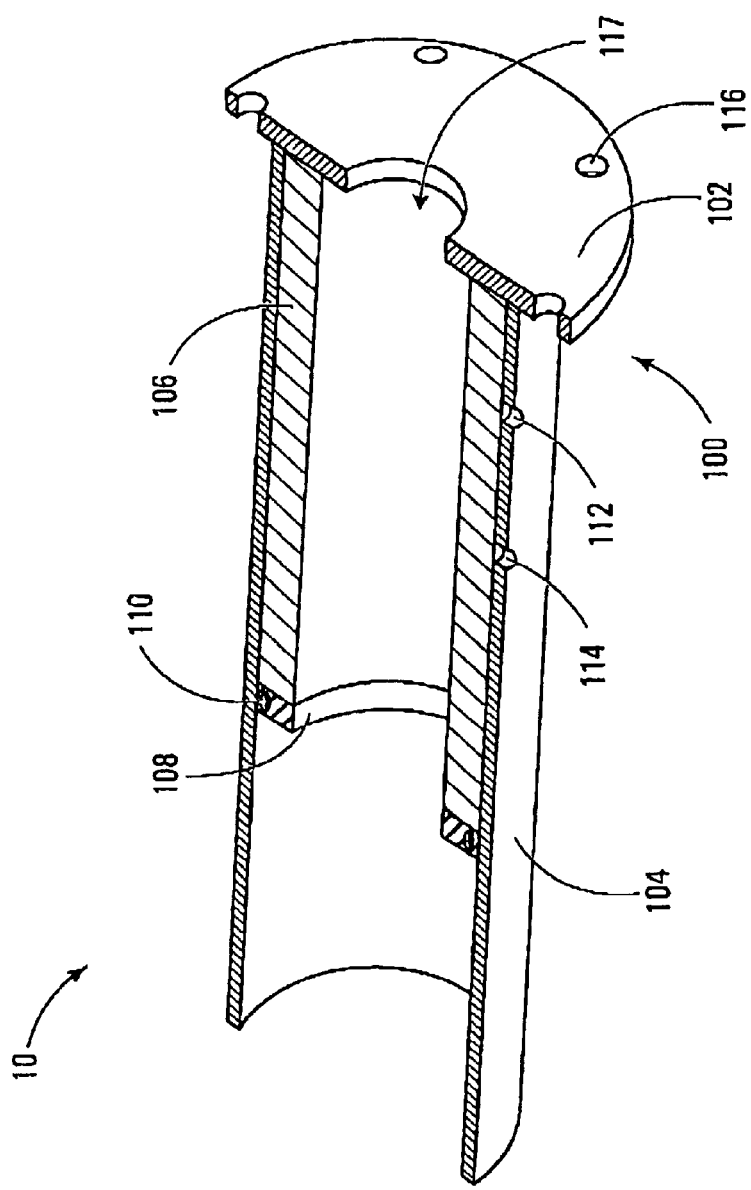
FIG. 3 is an isometric view of the well bore pressure containment device of FIGS. 1A, 1B, and 1C in an unpressurized state, with the containment device shown sectioned along its length to expose its interior.

Referring to FIGS. 1A, 1B, 1C, and 3, a well bore pressure containment device constructed according to the invention is described in terms of its structure. The well bore pressure containment device, generally indicated by 10, comprises an annular pressure spool 100 and a bladder 106. The spool 100 is an annular metal spool which consists of an annular flange 102 at one end of a hollow cylinder comprising an annular spool wall 104. Inside the annular spool 100 and extending concentric therewith is located the bladder 106 which is constructed as a hollow cylinder and may be made of rubber, polyurethane, or other appropriate flexible material. The bladder 106 has an outer radius smaller than that of the annular spool wall 104. An end of the bladder 106 is bonded to the flange end of the annular spool 100 and the opposite end of the bladder 106 is free floating. The floating end is secured to an annular sliding piston 108 which floats freely within the annular spool 100. The piston has an annular seal 110 which serves to seal the piston against the inner surface of the annular spool wall 104. Two holes are located in the annular spool wall 104 at positions along its height which overlap with the bladder, one hole serving as an inlet valve 112 and the other serving as an outlet valve 114. The annular flange 102 has an aperture 117 for passage of a tool string or tubing therethrough. In the preferred embodiment, the annular flange 102 has holes located exterior to the annular spool wall 104 for mounting the annular spool 100 to other equipment which in the preferred embodiment of the invention is the rig BOP which serves as a backup system for pressure containment.

Referring now to FIG. 2 the operation of the pressure containment device 10 shown in FIGS. 1A, 1B, 1C, and 3, is described. The device may be pre-set to withstand different pressure demands for different jobs, and may accommodate tool strings and tubing of differing diameters. FIG. 2 depicts the pressure containment device 10 with a tool string 118 present. In order to maintain pressure and contain the hydrocarbons a seal must be made between the inner surface of the bladder and the outer surface of the tool string. By pumping and releasing pressure respectively through the inlet valve 112 and the outlet valve 114 respectively into and out of the space interstitial of the bladder and the annular spool wall using a special hydraulic or pneumatic valving system, the bladder 104 may be made to expand or contract to varying degrees between a cylindrical tube-like shape and a roughly hyperbolic shape. The bladder 104 is able to freely deform in this manner due to one of its ends being a floating end secured to the floating piston 108 which is free to move along the axis of the annular spool. In this way pumping and releasing fluid pressure through the valves enables the diameter of the inner surface of the bladder to constrict at the bladder's apex (halfway along its length) to the diameter of the tool string 118 passing through the device. The pressure and may be pre-set to the required pressure to maintain a sufficient seal for the particular operation. In some embodiments, additional guiding elements are provided to ensure the bladder concentrically engages the tool string in a symmetric manner.

Referring to FIGS. 4A, 4B, and 4C an alternative embodiment of the pressure containment device 10 utilizing polyurethane fingers to help guide the bladder 106 and ensure that it concentrically engages the tool string passing therethrough, is described. To house the system by which the guide fingers are provided, the alternate embodiment has an outer spool 200 which is an annular metal spool concentric with the annular spool 100 having a diameter larger than that of the annular spool 100. One end of the outer spool 200 is fixed to the flange 102, the other end is fixed to the annular spool 100 via an annular member 220. The flange 102 is modified in this embodiment in that it is of a larger diameter. The annular spool 100 is modified in this embodiment to consist of two portions with a gap between them. An upper portion 100a of the annular spool 100 is fixed to the outer spool 200 via the annular member 220, and engages the annular sliding piston 108 as described in association with FIGS. 1A, 1B, 1C, 2, and 3. A lower portion of the annular spool 100b is fixed to the flange 102. An outer fixed piston 202 is fixed to the outer surface of the annular spool wall 104 of the lower portion 100b of the annular spool 100 and the inner surface of an outer spool wall 204 of the outer spool 200. An outer sliding piston 208, floats freely between the outer surface of the annular spool wall 104 of the upper portion 100a of the annular spool 100, and the inner surface of the outer spool wall 204. The outer sliding piston 208 has an inner annular seal 210a which serves to seal the outer sliding piston 208 against the outer surface of the annular spool wall 104, and an outer seal 210b which serves to seal the outer sliding piston 208 against the inner surface of the outer spool wall 204. Twelve cylindrical polyurethane fingers 206 have respective first ends bonded to the outer fixed piston 202 at evenly spaced angular positions. The second ends of the polyurethane fingers 206 are secured to the outer sliding piston 208 also at evenly spaced angular positions. The gap between the upper and lower portions 100a, 100b of the annular spool 100 exposes the bladder 106 to a first hydraulic chamber 118 in which the polyurethane fingers 206 are situated. Two holes are formed in the outer spool wall 204, one serving as the outlet valve 214 and the other serving as the inlet valve 212 to the first hydraulic chamber 118. The outer sliding piston 208, the upper portion 100a of the annular spool 100, the annular member 220, and the outer spool 200 define a second hydraulic chamber 216. Two apertures 218 and 220 are situated in the outer spool wall 204, one serving as a second hydraulic chamber outlet valve 220 and the other serving as a second hydraulic chamber inlet valve 218 to the second hydraulic chamber 216. In some embodiments a stop is located at a lower edge of the upper portion 100b of the annular spool 100 to prevent either or both of the annular sliding piston 108 and the outer sliding piston 208 from disengaging from the upper portion 100b of the annular spool 100.

The pressure containment device 10 functions in a similar manner to that described in association with FIGS. 1A, 1B, 1C, 2, and 3. By pumping and releasing pressure respectively through the inlet valve 212 and the outlet valve 214 respectively into and out of the first hydraulic chamber, the bladder 106 may be made to expand or contract to varying degrees between a cylindrical tube-like shape and a roughly hyperbolic shape. The bladder 106 is able to freely deform in this manner due to one of its ends being a floating end secured to the floating piston 108 which is free to move along the axis of the annular spool within the upper portion 100a of the annular spool. To assist in guiding the annular spool into symmetric and concentric engagement with a tool string or tube passing therethrough, polyurethane fingers 206 are made to forceably engage the outer surface of the bladder 106 by pumping and releasing pressure respectively through the second hydraulic chamber inlet valve 218 and the second hydraulic chamber outlet valve 220 respectively into and out of the second hydraulic chamber 216, to move the outer sliding piston 208 towards or away from the outer fixed piston 202. The movement of the outer sliding piston 208 in relation to the position of the outer fixed piston 202 causes the polyurethane fingers to bend or straighten to varying degrees between a bow-shaped cylindrical shape and a roughly straight cylindrical shape. The polyurethane fingers 206 are biased towards bending towards the axis of the annular pressure spool 100 by having in their relaxed state a slight bend inwards towards said axis. Each of the axes of the polyurethane fingers during their entire range of movement lies in a plane passing through the axis of the annular spool 100. By pumping and releasing fluid pressure through the second hydraulic chamber input and output valves, the polyurethane fingers engage and apply a force to the outer surface of the bladder 106, thereby keeping it engaged to the tool or tubing in a symmetric and concentric manner. The pressure may be pre-set to that required to maintain a sufficient force against the bladder 106. In a preferred embodiment the control of the hydraulic pressures in the first and second hydraulic chambers 118 and 216 is coordinated so that the proper pressure is applied to the bladder 106 while at the same time the outer piston 208 is movable in the desired direction.

In a preferred embodiment, the pressure containment device 10 sits above a BOP, and is mounted thereon using bolts passing through holes 116 of the flange 102 of the annular spool 100, and can be integrated into a rotating pressure control system. The pressure containment device 10 is flexible with respect to the size or diameter of tool string or tubing that can be stripped in and out of the pressure containment device 10 for access to the well bore. Tool strings and tubing of widely differing diameters may be accommodated by the pressure containment device 10 avoiding the increased costs incurred by the purchase and maintenance of multiple standard containment devices, and delays and lost production time due to the need to fit new standard spools or containment devices which fit each new tool string or tubing. This pressure containment device 10, due to its flexibility may be used in drilling and work over operations. Due to the flexibility of the pressure containment device, safety is increased since a wider range of sizes of tubing and tool strings are within the safe range of sizes compatible with the pressure containment device 10. Due to its design, the pressure containment device 10 is also smaller than standard devices and therefor lends itself to closely configured hydraulic jacking systems.

Although the preferred embodiments have been described as using a fluid to flex the bladder against the tool string or tubing passing therethrough, it should be understood that other mechanisms for applying a controllable force against the bladder, directed away from the spool wall and towards a tool passing therethrough, are possible. In fact, mechanical pressure exerted by rigid or semi-rigid fingers similar those described in association with the alternate embodiment could be used, or other mechanical members.

What has been described is merely illustrative of the application of the principles of the invention. Other arrangements and methods can be implemented by those skilled in the art without departing from the spirit and scope of the present invention.

What is claimed is:

1. An apparatus for use in containing well bore pressure, comprising:

a spool having a wall defining a passage therethrough for receiving a shaft;

a seal disposed within said passage and having a flexible seal wall having first and second opposed surfaces, the first surface defining an aperture for receiving the shaft, the flexible seal wall being capable of flexing away from the spool wall to sealably engage the shaft in response to a force applied thereto, the second surface of the flexible seal wall being accessible receiving a controllable force direct way from the spool wall and towards said aperture for urging the flexible seal wall inwardly of said passage; and a plurality of members positioned about the flexible seal wall, each for engaging said flexible seal wall and capable of receiving a force for urging the flexible seal wall radially towards an axis extending through said aperture.

2. An apparatus as claimed in claim 1, further comprising a chamber for receiving pressurized fluid and arranged to urge said flexible seal wall inwardly of said passage in response to pressurized fluid being introduced to said chamber.

3. An apparatus as claimed in claim 2, wherein said chamber has a chamber wall, at least part of which is defined by at least one of said spool wail and said flexible seal wall.

4. An apparatus as claimed in claim 2, further comprising a port formed in said spool wall for introducing pressurized fluid into said chamber.

5. An apparatus as claimed in claim 2, wherein said chamber is arranged such that said second surface is accessible over substantially the whole circumference thereof to pressure that can be exerted by a fluid.

6. An apparatus as claimed in claim 5, wherein said chamber extends substantially continuously about said flexible seal wail.

7. An apparatus as claimed in claim 2, wherein said chamber is adapted for receiving a liquid for hydraulically exerting a controllable force against said seal.

8. An apparatus as claimed in claim 2, wherein said chamber is adapted for receiving a gas for pneumatically exerting a controllable force on said seal.

9. An apparatus as claimed in claim 1, wherein the flexible seal wall has opposed ends spaced apart along said passage, and wherein at least one of said ends is capable of moving in a direction along said passage in response to said controllable force.

10. An apparatus as claimed in claim 9, further comprising a slidable sealing member disposed adjacent an end of said seal for sealingly engage the spool wall.

11. An apparatus as claimed in claim 1, wherein said seal has opposed ends spaced apart along said passage and said apparatus further comprises means for resisting movement of at least one end of said flexible seal wall in a direction transverse to and inwardly of said passage.

12. An apparatus as claimed in claim 11, wherein said resisting means comprises a member having less flexibility in said direction than said seal.

13. An apparatus as claimed in claim 12, wherein said resisting means comprises a grid annular piston capable of translating in a direction along the axis of said spool.

14. An apparatus as claimed in claim 1, wherein said flexible seal wall has a length extending along said passage and a thickness between said first and second surfaces, wherein said length is greater than said thickness.

15. An apparatus as claimed in claim 1, wherein each of said members has opposed ends spaced apart in a direction along said axis, said apparatus further comprising means for applying a compressional force between said ends to cause said members to flex inwardly towards said axis.

16. An apparatus as claimed in claim 15, wherein said means for applying a compressional force comprises a piston disposed adjacent an end of said members and arranged to urge the ends of said members in a direction towards their other ends when a force in said direction is applied to said piston.

17. An apparatus as claimed in claim 1, wherein said members are arranged to move inwardly by a substantially equal displacement when said members are compressed by a substantially equal displacement in a direction along said passage.

18. An apparatus as claimed in claim 1, wherein said members are substantially uniformly distributed about said flexible seal wall.

19. An apparatus as claimed in claim 1, wherein said seal comprises a tubular bladder.

20. An apparatus for use in containing well bore pressure, comprising: a spool having a wall defining a passage therethrough for receiving a shaft;
    a seal comprising a tubular bladder, disposed within said passage and having a flexible wall having first and second opposed surfaces, the first surface defining an aperture for receiving the shaft, the flexible wall being capable of flexing away from the spool wall to sealably engage the shaft in response to a force applied thereto, the second surface of the flexible wall being accessible for receiving a controllable force directed away from the spool wall and towards said aperture for urging the flexible wall inwardly of said passage;
    a rigid annular piston sealably receivable within said spool;
    an outer spool having an outer spool wail extending outside and about the spool;
    a plurality of cylindrical guiding fingers; and
    an outer rigid annular piston sealably receivable inside of the outer spool and extending sealably about the spool and capable of translating in a direction along the axis of the spool;
    wherein an outer surface of the flexible wall, an inner surface of the outer spool wall, and a first end surface of the rigid annular piston define a chamber adapted for a fluid for use in exerting the controllable force, wherein the bladder is sealably fixed at one end to an inner surface of the spool, and is sealably secured to the first end surface of the rigid annular piston at the other end of the bladder, wherein the rigid annular piston is capable of translating in a direction along an axis of the spool in response to variations in a pressure of a fluid in the chamber, wherein the spool comprises an upper portion a lower portion with a gap therebetween, wherein an axis of each cylindrical guiding finger lies in a plane passing through an axis of the spool, and wherein the plurality of cylindrical guiding fingers are fixed at respective first ends to the inner surface of the outer spool wall, and are secured to the outer annular piston at respective second ends, and wherein the plurality of cylindrical guiding fingers are adapted to be controllably deformed to forceably engage the outer surface of the flexible wall at portions thereof located at the gap in the spool using pressure exerted on the outer annular piston in a direction toward the first ends of the plurality of cylindrical fingers, thereby providing centering forces to the outer surface of the flexible wall.

21. A method of operating a seal for sealing to a shaft in a well bore, the method comprising:
    providing a seal having a flexible seal wall, said flexible seal wall having first and second opposed surfaces, the first surface defining aperture for receiving said shaft;
    applying a force to said second surface to urge said flexible seal wall against said shaft;and
    providing a plurality of members about the flexible seal wall for applying a force thereto, and causing each of said members to move radially towards or away from a central axis of said aperture by a substantially equal displacement.

22. A method as claimed in claim 21, further comprising controlling the force applied to said flexible seal wall by controlling the pressure of a fluid.

23. A method as claimed in claim 21, further comprising providing pressurized fluid against said second surface of said flexible seal wail to urge said seal against said shaft.

24. A method as claimed in claim 23, wherein the step of providing said pressurized fluid comprises providing said pressurized fluid around substantially the entire circumference of said second wall.

25. A method of operating a seal for sealing to a shaft in a well bore the method comprising:
    providing a seal having a flexible seal wall, said flexible seal wall having first and second opposed surfaces, the first surface defining an aperture for receiving said shaft;
    applying a force to said second surface to urge said flexible seal wall against said shaft;
    providing pressurized fluid against said second surface of maid flexible seal wall to urge said seal against said shaft; and
    providing a plurality of members about the second surface of the flexible seal wall for applying a force thereto, and causing each of said members to move radially towards or away from a central axis of said aperture by a substantially equal displacement, independently of any displacement by said fluid.

* * * * *

UNITED STATES PATENT AND TRADEMARK OFFICE
CERTIFICATE OF CORRECTION

PATENT NO. : 6,840,327 B2
DATED : January 11, 2005
INVENTOR(S) : Bruce Stephen Mitchell It is certified that error appears in the above-identified patent and that said Letters Patent is hereby corrected as shown below:

Column 6,
Line 21, "...accessible receiving..." should read -- ...accessible for receiving... --
Line 22, "...force direct away..." should read -- ...force direct away... --
Line 36, "...said spool wail..." should read -- ...said spool wall... --
Line 45, "...flexible seal wail..." should read -- ...flexible seal wall... --
Line 59, "...sealingly engage the..." should read -- ...sealingly engageing the... --

Column 7,
Line 2, "...comprises a grid annular..." should read -- ...comprises a rigid annular... --
Line 45, "...outer spool wail..." should read -- ...outer spool wall... --

Column 8,
Line 23, "...defining aperature..." should read -- ...defining an aperature... --
Line 36, "...seal wail to urge..." should read -- ...seal wall to urge... --
Line 42, "...well bore the method..." should read -- ...well bore, the method... --
Line 50, "...maid flexible seal..." should read -- ...said flexible seal... --

Signed and Sealed this

Fourteenth Day of June, 2005

JON W. DUDAS
*Director of the United States Patent and Trademark Office*